UNITED STATES PATENT OFFICE.

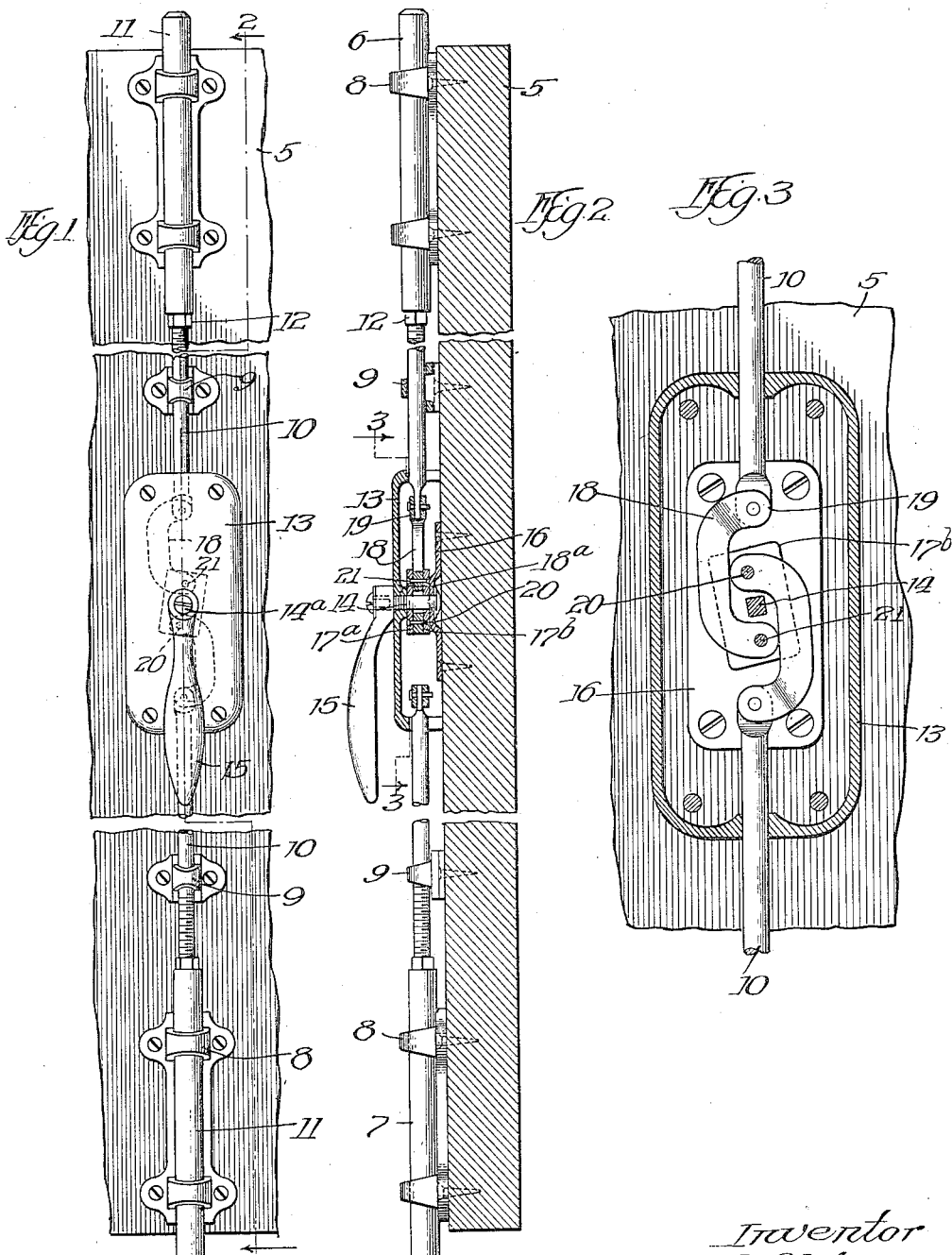

ROY B. OLDER, OF DANVILLE, ILLINOIS, ASSIGNOR TO ALLITH PROUTY COMPANY, OF DANVILLE, ILLINOIS, A CORPORATION OF ILLINOIS.

BOLT.

1,282,115.    Specification of Letters Patent.    Patented Oct. 22, 1918.

Application filed May 5, 1917. Serial No. 166,560.

*To all whom it may concern:*

Be it known that I, ROY B. OLDER, a citizen of the United States, residing in Danville, county of Vermilion, and State of Illinois, have invented certain new and useful Improvements in Bolts, of which the following is a specification.

My invention refers to bolts for French doors and particularly to that type of a bolt known as a Cremorne bolt.

One of the objects of my invention is to provide means for positively locking the bolts in outward and retracted position by means of the operating handle.

A further object is to provide means for preventing the bolts from dragging along the floor or sill when the windows or doors to which such bolts are attached are opened or closed.

Another object is to provide means for lengthening the bolts to adjust them to doors, windows, shutters, etc., of varying sizes.

Other objects will be apparent from an observation of the drawings, wherein—

Figure 1 is a front elevation of a Cremorne bolt, embodying my invention, the bolts being shown in extended position.

Fig. 2 is an end elevation partly in section showing the mechanism of Fig. 1.

Fig. 3 is an enlarged vertical section showing the position of the several parts when the bolts are in retracted position.

In the drawings, 5 indicates a door, shutter or window or the like to which is fastened a Cremorne bolt. This comprises upper and lower bolts 6 and 7 carried by guides 8 and 9. The bolts are connected with rods 10 having exteriorly screw threaded ends engaging within interiorly screw threaded openings in the adjacent ends of the bolts. Suitably mounted on the screw threaded ends of the rods 10 are lock nuts 12 for engaging the adjacent ends of the bolts 6 and 7 and retaining the rods and bolts in desired adjusted positions to regulate the throw of the bolts above and below the top and bottom of the doors.

13 is a casing mounted on the door 5 having apertures through which the inner ends of the rods 10 extend. Carried by the casing 13 is a horizontally disposed shaft 14 having a handle 15 connected to its outer end exteriorly of the casing in the preferred form shown. The other end of the shaft 14 is supported in a bracket 16 properly secured to the door 5 as best seen in Fig. 2. Preferably the shaft 14 has a squared portion on which are mounted spaced plates 17$^a$ and 17$^b$ so as to be movable therewith. The plates 17$^a$ and 17$^b$ are carried between the attaching plate 16 and a boss 18$^a$ formed in the outer wall of the casing 13.

For connecting the inner ends of the rods 10 with the plates 17$^a$ and 17$^b$ I prefer to employ C-shaped links or arms 18 provided with bifurcated ends 19 for pivotally engaging the inner ends of the rods 10 and end portions 20 for pivoted connection between the plates 17$^a$ and 17$^b$. While I have shown spaced plates 17$^a$ and 17$^b$ yet both may not be necessary as a single plate would perform in the same manner as the double plate. It will be apparent that as the plates 17$^a$ and 17$^b$ are rotated by the handle 15 and the shaft 14, the ends 20 of the links 18 will travel in a circular path while the ends 19 will travel in a straight line which line is coincident with the axes of the rods 10. Referring to Figs. 1 and 3 the position that the links 18 assume when the bolts 6 and 7 are in outward or retracted position will be apparent. To lock the bolts in fully extended position I prefer to mount the plates on the shaft 14 so that the ends 20 of the links 18 will be carried past the ultimate mechanical vantage point, that is, will be carried past the axial line of the rods 10. In other words the pivots 21 will be off center and past the critical point of stability. This results in the bolts 6 and 7 being locked in outward position. To retract the bolts the handle 15 is moved in counter clockwise direction. This movement rotates the plates causing the pivots 21 to move in a circular path in a direction opposite to that when moving the bolts into extended or locking position. The movement is continued until the pivots 21 are on opposite sides of the shaft 14 from the position shown in Fig. 1 and movement is continued until the pins 21 are off center on the same side of the axial line of the rods 10 but more than 180° from the first position, as shown in Fig. 3. The off center position of the plates will lock the bolts 6 and 7 in a retracted position and prevent the lower bolt from dragging on the floor or sill, in the same manner as locking the bolts in outward position.

As a means for lengthening or shortening the bolts so as to adapt a single outfit for application to doors, etc., of varying sizes within certain limits i. e. to a difference in height of say from one foot to two feet, etc., I provide bolts 6 and 7 having hollow interiors extending substantially throughout their lengths. For engagement therewith the ends of the rods 10 are threaded and extend within such interiors. For maintaining the bolts 6 and 7 in adjusted position nuts 12 are employed which are rotatably mounted on the bolts 6 and 7 and engage the threaded ends of the rods 10.

When a bolt embodying my invention is applied to a door or the like, the bolts 6 and 7 are adjustably positioned on the rods 10 so as to be retracted in a position so as to swing clear of any keepers, and the like, when the doors, etc., are opened or closed. It will be observed that the bolts embodying my invention are mounted so that their axes lie in the same straight line.

This device permits the operation of a Cremorne bolt into locking or unlocking position by a single movement of the handle which movement also locks the bolts in outward or in retracted position which cannot be moved until the handle is operated.

It will be apparent that modifications of this device may be made and such modifications I consider as coming within the scope of my invention.

Having fully described my invention, what I claim by Letters Patent is:

1. The combination of a pair of endwise movable longitudinally alined spaced bolts, a rotatable shaft disposed between the inner ends of the bolts, and a pair of reversely disposed substantially C-shaped toggle links connecting the inner ends of the bolts with the shafts, the shaft end of each link lying between the shaft and the other bolt in the retracted positions of the bolt with the shaft end of each link in contact with the other link, and the shaft end of each link lying at the opposite side of the shaft in the projected positions of the bolts, and in engagement with the shaft and thereby stopped against further movement in one direction, the path of movement of the shaft end of each link exceeding 180 degrees.

2. The combination of a pair of endwise movable longitudinally alined spaced bolts, a rotatable shaft disposed between the bolts, a cross-head carried by the shaft, and a pair of substantially C-shaped toggle links connecting the bolts and the cross-head, each link being pivoted at one end to a bolt and having its opposite shaft end pivotally connected to the cross-head, the shaft end of each link being between the shaft and the opposite bolt and also in engagement with the other link and the pivotal connections of the shaft ends of the links being beyond the line of the bolts in the direction of movement of said ends of the links in the retracted positions of the bolts, and each shaft end of each link lying at the opposite side of the shaft and in engagement therewith as a stop in the projected positions of the bolts, the path of movement of the shaft end of each link exceeding 180 degrees.

Signed at Danville, State of Illinois this 2nd day of April A. D., 1917.

ROY B. OLDER.

Witnesses:
H. R. MAXWELL,
A. L. JENKINS.